(12) United States Patent
Brown et al.

(10) Patent No.: US 7,093,246 B2
(45) Date of Patent: Aug. 15, 2006

(54) AUTOMATED UPDATES OF SOFTWARE AND SYSTEMS

(75) Inventors: Mark S. Brown, Kingston, NY (US); Grant D. Miller, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/325,741

(22) Filed: Dec. 20, 2002

(65) Prior Publication Data

US 2004/0123283 A1 Jun. 24, 2004

(51) Int. Cl.
*G06F 9/44* (2006.01)
*G06F 9/445* (2006.01)
*G06F 15/16* (2006.01)

(52) U.S. Cl. .......................... 717/173; 717/178; 726/3; 726/10; 709/203; 709/227

(58) Field of Classification Search ........ 717/168–178, 717/103; 707/10, 203; 709/219, 203, 227, 709/232, 249, 223, 224; 705/59; 726/2–4, 726/10, 7, 17, 26, 31

See application file for complete search history.

(56) References Cited

U.S. PATENT DOCUMENTS

| | | | |
|---|---|---|---|
| 5,835,911 A | | 11/1998 | Nakagawa et al. |
| 5,870,610 A | | 2/1999 | Beyda |
| 5,933,646 A | | 8/1999 | Hendrickson et al. |
| 5,999,947 A | * | 12/1999 | Zollinger et al. ........... 707/203 |
| 6,061,686 A | * | 5/2000 | Gauvin et al. ................ 707/10 |
| 6,067,582 A | | 5/2000 | Smith et al. |
| 6,151,708 A | * | 11/2000 | Pedrizetti et al. ........... 717/173 |
| 6,157,940 A | * | 12/2000 | Marullo et al. ............... 703/27 |
| 6,167,567 A | * | 12/2000 | Chiles et al. ............... 717/173 |
| 6,202,207 B1 | | 3/2001 | Donohue |
| 6,282,709 B1 | | 8/2001 | Reha et al. |
| 6,282,712 B1 | * | 8/2001 | Davis et al. ................ 717/170 |
| 6,314,565 B1 | | 11/2001 | Kenner et al. |
| 6,332,217 B1 | | 12/2001 | Hastings |
| 6,360,255 B1 | | 3/2002 | McCormack et al. |
| 6,381,741 B1 | | 4/2002 | Shaw |
| 6,467,088 B1 | | 10/2002 | alSafadi et al. |
| 6,493,871 B1 | * | 12/2002 | McGuire et al. ............ 717/173 |

(Continued)

FOREIGN PATENT DOCUMENTS

| | | |
|---|---|---|
| JP | 2001236210 A | 8/2001 |
| JP | 200202055839 A | 2/2002 |

OTHER PUBLICATIONS

Microsoft Press computer dictionary, third edition, p. 469, published on 1997.*

(Continued)

*Primary Examiner*—Antony Nguyen-Ba

(57) ABSTRACT

These and other objectives are attained with a method and system for updating software applications or systems on a target client. The method comprises the steps of providing the target client with an update manager; and using the update manager to initiate a procedure to compare the level of software or services on the target client with the level of software or services available on a specified server to determine if an update is available on the server for the software or services on the target client. If an update is available, the update is copied from the server to the target client. Preferably, the update manager registers with the server manager to have a specified one or more of the applications or systems updated. The preferred embodiment of the invention uses information that currently exists with the customer and vendor that can make the update process more automated.

7 Claims, 2 Drawing Sheets

U.S. PATENT DOCUMENTS

| | | | |
|---|---|---|---|
| 6,643,669 B1 * | 11/2003 | Novak et al. | 707/201 |
| 6,751,674 B1 * | 6/2004 | Satagopan et al. | 709/249 |
| 6,785,716 B1 * | 8/2004 | Nobakht | 709/219 |
| 6,789,255 B1 * | 9/2004 | Pedrizetti et al. | 717/169 |
| 6,832,373 B1 * | 12/2004 | O'Neill | 717/171 |
| 6,898,618 B1 * | 5/2005 | Slaughter et al. | 709/203 |
| 6,959,320 B1 * | 10/2005 | Shah et al. | 709/203 |
| 2002/0078142 A1 | 6/2002 | Moore et al. | |
| 2002/0100035 A1 | 7/2002 | Kenyon et al. | |
| 2002/0120725 A1 | 8/2002 | DaCosta et al. | |
| 2002/0138567 A1 | 9/2002 | Ogawa | |

OTHER PUBLICATIONS http://www.macobserver.com/news/00/may/000509/update-agent801.shtml, "Update Agent Scouts Out an Update for Itself", last updated Oct. 18, 2002.

http://www.redhat.com/about/presscenter/2001/press_network.html, "Red Hat Network Software Manager Delivers Greater Reliability and Productivity for the Management of Red Hat Linux Systems", last updated Oct. 18, 2002.

* cited by examiner

AUTOMATED UPDATES OF SOFTWARE AND SYSTEMS

BACKGROUND OF THE INVENTION

1. Field of the Invention

This invention generally relates to updating software and operating systems. More specifically, the invention relates to the automatic updating of software and operating systems on a target, client system.

2. Background Art

Software and operating systems are constantly being updated with new features or with fixes to solve defects. The applications and systems can be updated with full product releases or with incremental releases.

Presently, customers that own applications and systems are required to get the updates and upgrade their software. The customer can get updates from a vendor, either electronically over the Internet, or physically on a CD tape, etc. In some cases, the customer must prove their entitlement to a software product or operating system before they are allowed to retrieve an update.

Customers can have multiple products residing on one machine from multiple vendors, and can have multiple platforms at their sites. Some products can update themselves, while others cannot. It would be highly desirable to provide customers with a solution that could provide updates for a single machine, or for their entire IT network. In addition, some IT networks are behind firewalls and require secure access to automatic updates.

SUMMARY OF THE INVENTION

An object of this invention is to provide automated electronic software updates and services for systems and applications across disparate platforms.

Another object of the present invention is to create a layer, between a target and a host with the updates, that controls the updating of applications and systems without having to have the technology embedded into a product.

A further object of the invention is to provide a business intelligence for software updates and services that acts as a middle layer, or director, between a target system and a host that stores updates.

Another object of the invention is to provide an environment in which a client and a server can interact with mutual assurance that their transactions are secure.

These and other objectives are attained with a method and system for updating software applications or systems on a target client. The method comprises the steps of providing the target client with an update manager, and using the update manager initiate a procedure to compare the level of software or services on the target client with the level of software or services available on a specified server to determine if an update is available on the server for the software or services on the target client. If an update is available, the update is copied from the server to the target client. Preferably, the update manager registers with the server manager to have a specified one or more of the applications or systems updated.

The above-mentioned procedure that is initiated by the update manager to compare the level of software, may be performed by the server, or alternatively, this procedure may be performed by the update manager or the update manager and the server may work together to perform this procedure. Also, the preferred embodiment of the invention uses information that currently exists with the customer and vendor that can make the update process more automated. In particular, customers know (or the information exists in their systems) what software levels they have installed, and the vendor knows what they are entitled to. Instead of requiring the customer to access a site, determine if an update is available, then locate the update, and provide entitlement information, the preferred embodiment of the present invention provides a procedure that knows enough about the customers and their system or systems to navigate finding and retrieving an update on their behalf.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
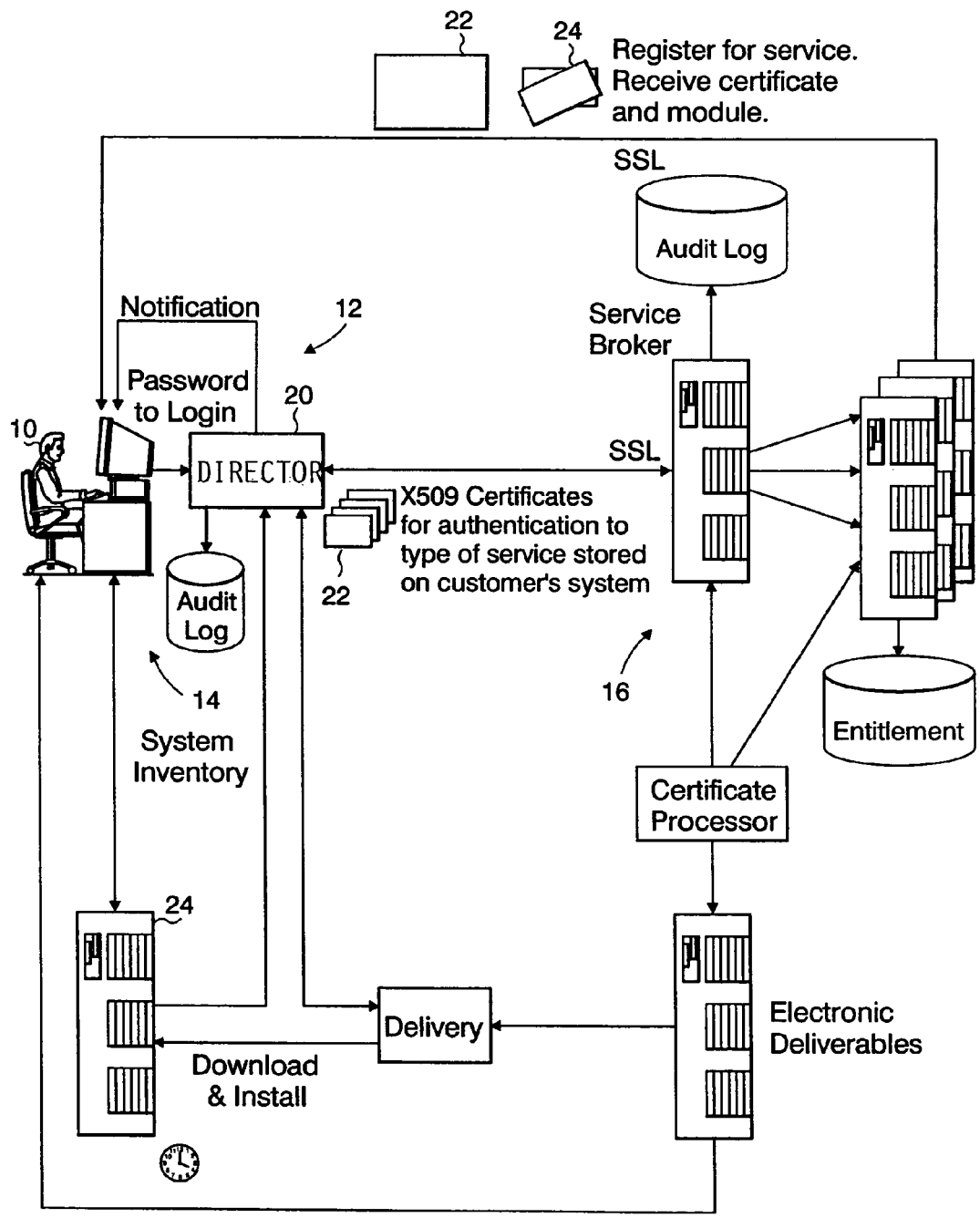
FIG. 1 illustrates the present invention and the process flows between the client and an update server.

With reference to FIG. 1, in the preferred operation of the present invention, a user or customer 10 registers for the update services for a specific product. A user 10 can register for multiple products on multiple platforms. A client 12 is used to check periodically if an update is available. This is done by having the client 12 send information about the target system 14, and what is installed on it, to a host 16 for comparison. The client provides knowledge of the environment to provide updated content back to the customer 10.

If an update exists, the user is notified that an update is available. The user can then select to have a director 20 retrieve the update using the proper credentials to identify the user and the target product to update. The director 20 then notifies the user 10 that the update has been retrieved and is ready to be installed. The director 20 controls the amount of data that needs to be shipped by the host by only shipping what is needed to the target.

More specifically, a customer 10 registers for an automated update service through a portal. Updates can include upgrades, services or publications. A certificate 22 is returned for each service. Customer information is stored at site 24. A module may be added onto director 20 to handle a specific platform. If needed, that module is downloaded and added.

Director 20 periodically checks for updates to registered products. Service and product availability are based on certificates 22. System checks system inventory for synchronization. System configuration is sent to server 16.

If an update is available, a notification is sent to the customer 10 informing him or her of the new update. If the customer wishes to, he or she can launch system 16 and send an automatic update request. Any necessary customer information, it may be noted, is already stored. If multiple updates are available, the customer can select individual ones to update.

Director 20 places an order for an upgrade, and the director periodically checks for a completed order. If the order is ready and the customer operating system 12 is validated, a ticket 24 is issued for the order and sent back to the client 12.

Director 20 notifies server 16 to retrieve the order. The ticket 24 sent to server 14 will automatically keep retrying in case of interrupted transfer until the download is completed. Once download is complete, a message is sent back to notify the customer 10. Customers can initiate installation through director 20 or by their own computer system.

Figure 2:
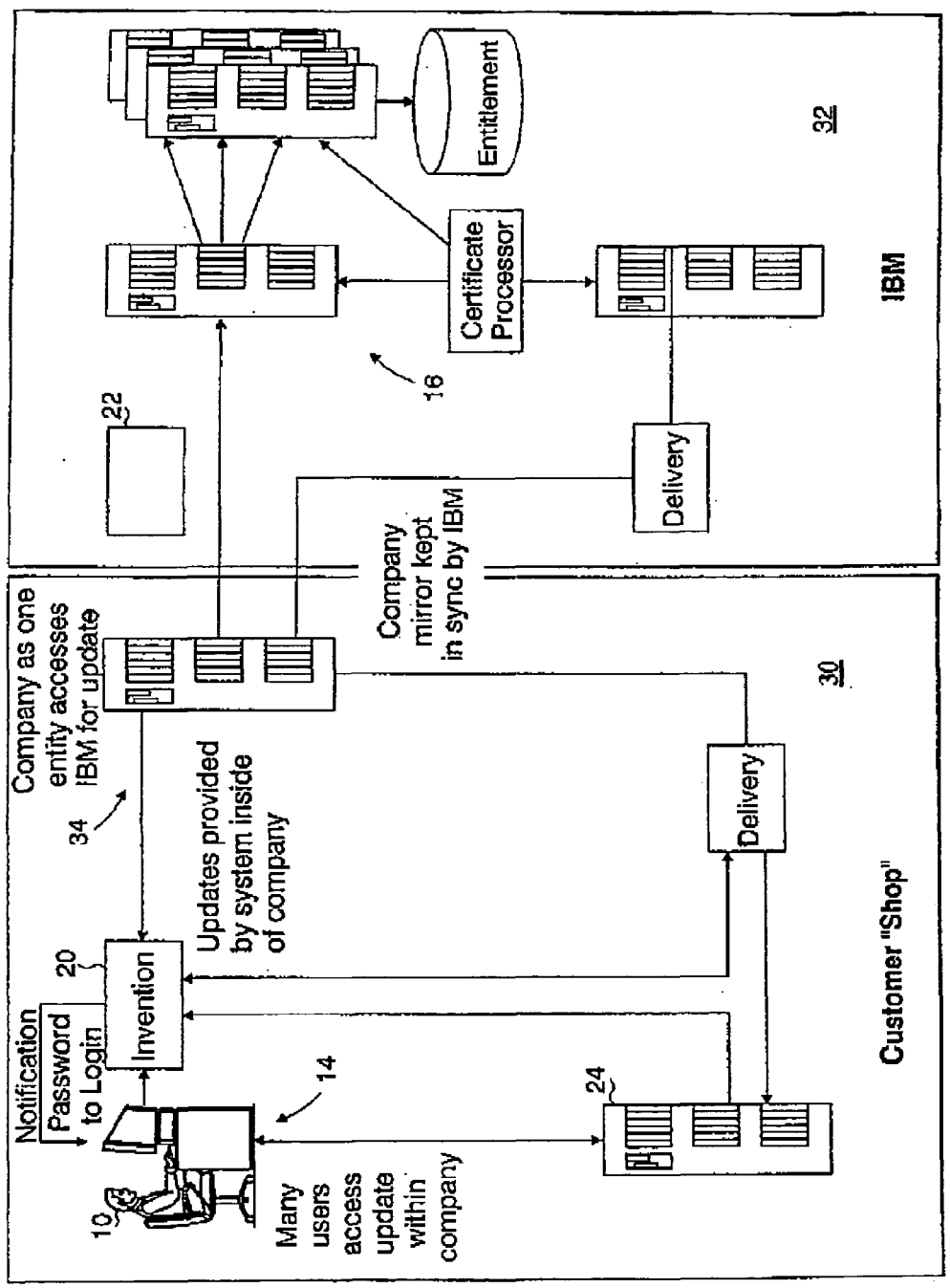
FIG. 2 illustrates an alternate embodiment of the invention in which a tiered model is provided to support closed infrastructures.

The user 10 can configure director 20 to have various degrees of automation, with multiple checkpoints or none. In this way, the present invention can be used as a policy director for managing updates. For instance, as illustrated in FIG. 2, system architecture can be separated into a customer part 30 or "shop," and a service provider part 32, and with these two parts communicating with each other via a service broker 34.

The preferred embodiment of the invention, as described above, provides a number of important advantages. The invention effectively addresses the problem of providing automatic updating of software and operating systems on a target, client system by creating a layer between the product installed on a client's system and the developer of the product. A program, installed on the client's system, can query the installed products and levels, and communicates that information to a server that can determine if an update is available. By solving the problem in this way, the product itself does not have to be modified to look for updates.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method for a client computer to obtain an update to a computer program, said method comprising the steps of:
    a user of the client computer registering with a remote update service, and in response, said client computer obtaining a certificate for said update service, said certificate identifying said user;
    sending said certificate to a server, and in response,
        said server determining& based in part on the user identified in the certificate, a specific computer program for which said user is entitled to receive updates if any,
        said server identifying an update to said computer program, and
        said server sending to said client computer a notification of said update;
    based in part on said notification, said client computer requesting a ticket for said update, and in response, said server initiating sending of said ticket to said client computer, said ticket identifying said update;
    said client computer sending a request for said update, said request including said ticket; and
    in response to said request including said ticket, downloading said update to said client computer.

2. A method as set forth in claim 1, further comprising the step of said server validating an operating system of said client computer for said update, before the step of said server initiating sending of said ticket to said client computer.

3. A method as set forth in claim 1, wherein the step of said client computer requesting a ticket for said update is also based on input from said user to request said update.

4. A system to obtain an update to a computer program, said system comprising:
    a client computer including means for enabling a user to register with a remote update service, and in response, obtain a certificate for said update service, said certificate identifying said user;
    means for sending said certificate to a server;
    said server including means, responsive to said certificate, for determining, based in part on the user identified in the certificate, a specific computer program for which said user is entitled to receive updates if any;
    said server including means, responsive to said certificate, for identifying an update to said computer program;
    said server including means, responsive to said certificate, for sending to said client computer a notification of said update;
    said client computer including means, based in part on said notification, for requesting a ticket for said update;
    said server including means, responsive to said request for said ticket, for initiating sending of said ticket to said client computer, said ticket identifying said update; and
    said client computer including means for sending a request for said update, said request including said ticket.

5. A system as set forth in claim 4 further comprising means, responsive to said request including said ticket, for downloading said update to said client computer.

6. A system as set forth in claim 4, wherein said server further comprises means for validating an operating system of said client computer for said update, before said server initiating sending of said ticket to said client computer.

7. A system as set forth in claim 4, wherein the means for requesting a ticket for said update is also based on input from said user to request said update.

* * * * *